US008661298B2

(12) United States Patent
Muralimanohar et al.

(10) Patent No.: US 8,661,298 B2
(45) Date of Patent: Feb. 25, 2014

(54) CONTROLLING NANOSTORE OPERATION BASED ON MONITORED PERFORMANCE (75) Inventors: Naveen Muralimanohar, Santa Clara, CA (US); Parthasarathy Ranganathan, San Jose, CA (US); Jichuan Chang, Sunnyvale, CA (US)

(73) Assignee: Hewlett-Packard Development Company, L. P., Houston, TX (US)

( * ) Notice: Subject to any disclaimer, the term of this patent is extended or adjusted under 35 U.S.C. 154(b) by 313 days.

(21) Appl. No.: 13/098,172

(22) Filed: Apr. 29, 2011

(65) Prior Publication Data

US 2012/0278650 A1    Nov. 1, 2012

(51) Int. Cl.
*G06F 11/00* (2006.01)
(52) U.S. Cl.
USPC .......................................... 714/47.1
(58) Field of Classification Search
USPC .......................................... 714/47.1
See application file for complete search history.

(56) References Cited

U.S. PATENT DOCUMENTS

| 7,526,684 | B2 | 4/2009 | Bicknell et al. |
| 7,728,614 | B2 | 6/2010 | Cahoon |
| 2005/0229060 | A1* | 10/2005 | Cochran et al. ............... 714/733 |
| 2008/0141072 | A1 | 6/2008 | Kalgren et al. |
| 2010/0309734 | A1 | 12/2010 | Ehrenreich et al. |
| 2011/0173484 | A1* | 7/2011 | Schuette et al. ................... 714/2 |
| 2012/0159276 | A1* | 6/2012 | Zandian et al. ............... 714/734 |

OTHER PUBLICATIONS

Agarwal et al., "Circuit Failure Prediction and Its Application to Transistor Aging," 25th IEEE VLSI Test Symposium 2007 (8 pages).
Mitra, Subhasish, "Circuit Failure Prediction for Robust System Design in Scaled CMOS," IEEE 46th Annual International Reliability Physics Symposium, Phoenix, 2008 (8 pages).
Shu et al., "Shadowing-based Crash Recovery Schemes for Real-Time Database Systems," 1999 (8 pages).
Ranganathan, Parthasarathy, "From Micro-processors to Nanostores: Rethinking Data-Centric Systems," IEEE Computer Society, Jan. 2011, (10 pages).

* cited by examiner

*Primary Examiner* — Michael Maskulinski
*Assistant Examiner* — Neil Miles (57) ABSTRACT Methods, apparatus and articles of manufacture for controlling nanostore operation based on monitored performance are disclosed. An example method disclosed herein comprises monitoring performance of a nanostore, the nanostore including compute logic and a datastore accessible via the compute logic, and controlling operation of the nanostore in response to detecting a performance indicator associated with wearout of the compute logic to permit the compute logic to continue to access the datastore.

19 Claims, 7 Drawing Sheets

CONTROLLING NANOSTORE OPERATION BASED ON MONITORED PERFORMANCE

BACKGROUND

A nanostore is a new type of processing building block that supports the data-centric and input/output intensive characteristics of modern computing applications and services. Nanostores collocate compute logic and a nonvolatile datastore, thereby eliminating one or more intervening levels of storage hierarchy present in typical existing processing systems. For example, a single nanostore building block (e.g., chip package) can include a datastore implemented as one or more layers of nonvolatile memories, such as phase change memories, memristors, etc., and a layer of compute logic containing data access logic and one or more computation cores.

DETAILED DESCRIPTION

Methods, apparatus and articles of manufacture for controlling nanostore operation based on monitored performance and failures are disclosed herein. As noted above, a nanostore is an architectural building block, such as a single chip package, that collocates compute logic and a nonvolatile datastore. However, the compute logic and the datastore of the nanostore, although contained in a single package, can experience wearout and, thus, failure at different rates. Generally, the entire nanostore becomes unusable when either one of its compute logic or its datastore experience wearout to the point of failure, even if the other component is still operational. For example, because data stored in the datastore is typically accessible via only the compute logic, the data stored in a nanostore may no longer be retrievable if the compute logic fails before the datastore, even though the datastore portion of the nanostore is still operational.

Prior approaches for addressing the problem of nanostore wearout and corresponding failure involve implementing redundancy in the compute logic (e.g., at the hardware level) to reduce the likelihood of failure in that portion of the nanostore, and/or maintaining redundant copies of the data (e.g., usually at the software level) in various system locations such that a copy of the data can be retrieved when the data stored in the nanostore is rendered inaccessible due to the compute logic failure. However, these prior approaches come at a cost of added complexity and power consumption.

To address these and/or other problems related to nanostore wearout, example methods, apparatus and articles of manufacture disclosed herein control nanostore operation based on monitored performance of the nanostore to, for example, compensate for differences between the wearout of the nanostore compute logic and the nanostore datastore. For example, nanostore operation can be controlled to enable the data stored in the nanostore to be accessed and, for example, retrieved and backed-up when the monitored performance of the compute logic indicates that wearout may soon prevent access to the datastore (e.g., such as when logic unrelated to data access has already started to fail). In some examples, performance monitoring involves monitoring for indicators, such as timing variations/violations, voltage fluctuations, increased parity and/or error correcting code (ECC) errors in buffers/caches, etc., indicative of wearout (including failure) of the compute logic. In such examples, if one or more indicators of wearout (or possible/predicted wearout) are detected, operation of the compute logic included in the nanostore is adjusted to reduce the rate of wearout, such as by, but not limited to, reducing the operating speed and/or operating voltage of the compute logic. Because wearout prior to failure is typically gradual, reducing the rate of wearout in accordance with the example disclosed methods, apparatus and articles of manufacture can provide sufficient time for data stored in the nanostore to be retrieved before compute logic failure occurs.

Additionally or alternatively, some example methods, apparatus and articles of manufacture disclosed herein control nanostore operation based on comparing the wearout of the nanostore compute logic relative to the wearout of the nanostore datastore. For example, operation of the compute logic can be adjusted to increase operating performance of the nanostore in response to determining that the wearout of the datastore is worse (e.g., closer to the point of failure) than the wearout of the compute logic, or to decrease operating performance of the nanostore in response to determining that the wearout of the compute logic is worse (e.g., closer to the point of failure) than the wearout of the datastore. Nanostore operating performance can be increased by, for example, increasing an operating speed and/or operating voltage of the compute logic included in the nanostore, whereas nanostore operating performance can be decreased by, for example, decreasing the operating speed and/or operating voltage of the compute logic. As such, in some examples, when wearout of the datastore is determined to be worse than the wearout of the compute logic, the nanostore can be tailored to run more computationally intensive workloads at the expense of possibly increasing the rate of wearout of the compute logic. Conversely, when wearout of the compute logic is determined to be worse than the wearout of the datastore, the nanostore can be tailored to, for example, operate as merely a storage node and/or an input/output (I/O) processing node to potentially increase the useful life of the compute logic and, thus, the nanostore.

Figure 1:
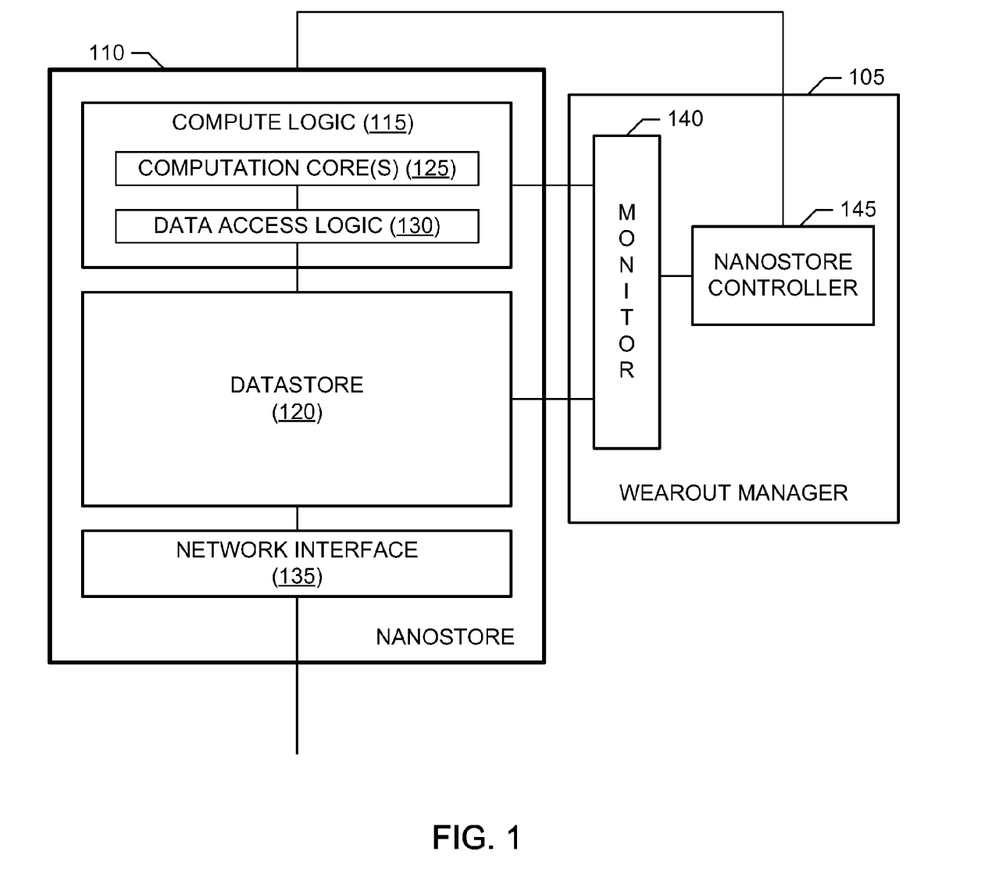
FIG. 1 is block diagram of an example wearout manager in communication with an example nanostore to control operation of the nanostore based on monitored performance.

Turning to the figures, a block diagram of an example wearout manager 105 to control operation of an example nanostore 110 based on monitored performance of the nanostore 110 is illustrated in FIG. 1. The nanostore 110 of the illustrated example includes example compute logic 115 collocated with an example datastore 120. As such, the nanostore 110 is like a single-chip computer with a flattened memory hierarchy that eliminates one or more intervening levels that are typically included in existing memory hierarchies. The example compute logic 115 includes one or more example computation cores 125 to provide central processing unit (CPU) functionality, such as arithmetic logic unit (ALU) functionality, machine readable instruction decoding and processing, etc. The example compute logic 115 also includes example data access logic 130 to enable the computation core(s) 125 to access the datastore 120. For example, the data access logic 130 can implement functionality similar to one or more cache levels, one or more registers, etc., to enable data to be transferred between the compute logic 115 and the datastore 120.

In some examples, the compute logic 115 is implemented using any appropriate type of semiconductor technology, such as complementary metal oxide semiconductor (CMOS) technology. In some examples, the datastore 120 is implemented by any type of nonvolatile memory, such as flash memory, memristors, phase change memory (PCM), etc. For example, the datastore 120 can be implemented by one or more three-dimensional (3D) stacked layers of dense silicon nonvolatile memories, such as PCMs, flash and/or memristors. In such an example, the compute logic 115 can be implemented by a top layer of power-efficient compute cores, with through silicon vias being used to provide wide, low-energy data paths between the compute logic 115 and the datastore 120.

The nanostore 110 of the illustrated example further includes an example network interface 135 to enable the nanostore to be integrated into a larger processing system, such as the example system 200 of FIG. 2, which is described in greater detail below. The network interface 135 can be implemented by, for example, one or more layers providing optical or electrical network interfaces, bus, crossbar and/or memory mapped interfaces, etc.

The wearout manager 105 of the illustrated example controls operation of the nanostore 110 based on monitored performance in accordance with the example methods, apparatus and articles of manufacture disclosed herein. As such, the example wearout manager 105 of FIG. 1 includes an example monitor 140 to monitor performance of the nanostore 110 and an example nanostore controller 145 to control operation of the nanostore 110 based on such monitored performance. In some examples, the monitor 140 is coupled to the nanostore 110 in any appropriate manner to monitor for performance indicators related to (e.g., indicative of or capable of predicting) wearout of the compute logic 115 portion of the nanostore 110. In some examples, the monitor 140 is additionally or alternatively coupled to the nanostore 110 in any appropriate manner to monitor for performance indicators related to (e.g., indicative of or capable of predicting) wearout of the datastore 120 portion of the nanostore 110. The nanostore controller 145 included in the wearout manager 105 receives and processes the monitored data/results provided by the monitor 140 to detect one or more performance indicator(s) that indicate (or predict) the wearout of the compute logic 115 and/or the datastore 120 of the nanostore 110. The nanostore controller 145 then processes these performance indicator(s) to adjust performance of the nanostore 110 accordingly.

In some examples, operation of the wearout manager 105 is based on one or more of the following observations. Generally, one or more factors can contribute to failure of a CMOS chip. Factors that can cause CMOS chip failure include, for example, gate oxide breakdown, hot carrier injection, bias temperature instability (BTI), electron migration, thermal cycling, etc. Also, high operating voltage and temperature can accelerate aging and, thus, wearout. Memory structures implemented by flash, PCM, memristors, etc., can also fail due to wearout of memory cells. As compared to computational logic (e.g., the compute logic 115), memory structures typically operate at a relatively low temperature and, thus, may age at a lower rate than the computational logic. As such, the nanostore 110, which includes the datastore 120 and the compute logic 115, contains different components that can experience different wearout and, thus, different failure rates. As noted above, the failure of either the compute logic 115 or the datastore 120 results in the failure of the nanostore 110. However, in some examples, wearout of the nanostore 110 can happen gradually, such as over many days or even weeks. Also, as the compute logic 115 experiences wearout, the operating speed of the compute logic 115 typically degrades gradually, which can eventually cause timing assumptions to be broken and, thus, cause timing violations to occur (e.g., such as timing violations associated with pipeline processing, one or more critical paths, etc.), increased in parity/ECC errors observed in nanostore buffers/caches, etc. The operating voltage may also fluctuate as the compute logic 115 experiences wearout. With respect to the datastore 120, the number and/or rate of memory access errors may gradually increase as the datastore 120 experiences wearout. In some examples, the data access errors may initially be hidden until the number and/or rate of errors exceeds the capabilities of the error detection and correction circuitry associated with the datastore 120.

Based on the foregoing observations, the monitor 140 monitors the performance of the compute logic 115 related to wearout, such as monitoring for timing variation(s)/violation(s), voltage fluctuation(s), parity/ECC errors, etc. Additionally or alternatively, the monitor 140 monitors the performance of the datastore 120 related to wearout, such as monitoring for data access error(s) (e.g., such a memory read error(s), memory write error (s), etc.) that occur when the datastore 120 is accessed. The nanostore controller 145 then uses the monitored performance data/results obtained from the monitor 140 to adjust operation of the nanostore 110 in accordance with the wearout indicated by the monitored performance data/results. Additionally or alternatively, the nanostore controller 145 can use monitored performance data/results obtained from the monitor 140 to adjust operation of the nanostore 110 in accordance with possible future wearout as predicted by the monitored performance data/results.

For example, when the nanostore controller 145 determines from the monitored performance that the wearout of the compute logic 115 is worse (e.g., more advanced) than the wearout of the datastore 120, the nanostore controller 145 can control the nanostore 110 (e.g., by reducing the operating speed and/or the operating voltage) to operate as a storage node and/or an I/O processing node to potentially increase the useful life of the compute logic 115 and, thus, the nanostore 110. Conversely, when wearout of the datastore 120 is determined to be worse (or more advanced) than the wearout of the compute logic 115, the nanostore controller 145 can control the nanostore 110 (e.g., by increasing the operating speed and/or the operating voltage) to run more computationally intensive workloads at the expense of possibly increasing the rate of wearout and, thus, reducing the service lifetime of the compute logic 115 (e.g., to substantially match the expected service lifetime of the datastore 120).

In some examples, the wearout manager 105 additionally or alternatively adjusts operation of the nanostore 110 to enable data stored in the nanostore 110 to be accessed and, for example, retrieved and backed-up when the monitored performance of the compute logic 115 indicates that wearout may soon prevent access to the datastore 120. For example, the nanostore controller 145 uses the performance monitoring data/results provided by the monitor 140 to determine whether a timing violation, or a timing variation exceeding an aging guard band has occurred. Such a guard band can specify a range of timing deviations which, when exceeded, indicates that the compute logic 115 is no longer capable of executing workloads at the expected operating speed of the nanostore 110. If a timing violation is detected, or a timing variation is determined to exceed the aging guard band, the nanostore controller 145 decrements or otherwise reduces the operating speed (and/or the operating voltage) of the nanostore 110 until the compute logic 115 does not trigger any timing violations, or the timing variations are within the guard band. In this way, the nanostore 110 could potentially be made to work at a lower operating speed (e.g., a lower operating clock rate, a lower oscillator frequency, etc.) for some period of time before failure occurs.

After the operating speed (and/or the operating voltage) of the nanostore 110 is decremented (e.g., reduced) to a point at which the compute logic 115 is determined to be operating reliably (e.g., such that timing variations are within the guard band and/or memory access errors are no longer detected), the nanostore controller 145 causes the data stored in the datastore 120 to be accessed for recovery and backup. In some examples, instead or, or in addition to, backing up the data stored in the datastore 120, the nanostore controller 145 causes a summary of the data to be created and backed-up. The data (or data summary) can be backed up in one or more other nanostores and/or other archival memory (not shown). In some examples, the data access path is not in the critical timing path of the nanostore 110, and moving data from the datastore 120 processor to another working storage (e.g., via the network interface 135) involves the compute logic 115 only minimally (e.g., to implement a cache coherence protocol or remote direct memory access (RDMA)). In such examples, it may be possible to achieve full data access speed for the backup process. Also, in some examples, the wearout of the compute logic 115 is manifested as gradual slowdown at the macroscopic level. In such examples, the nanostore controller 145 can use the monitored performance to predict the wearout of the compute logic 115 and then proactively backup data stored in the aging nanostore 110 before a timing fault occurs and/or before any monitored timing variation(s) exceed the aging guard band.

Figure 2:
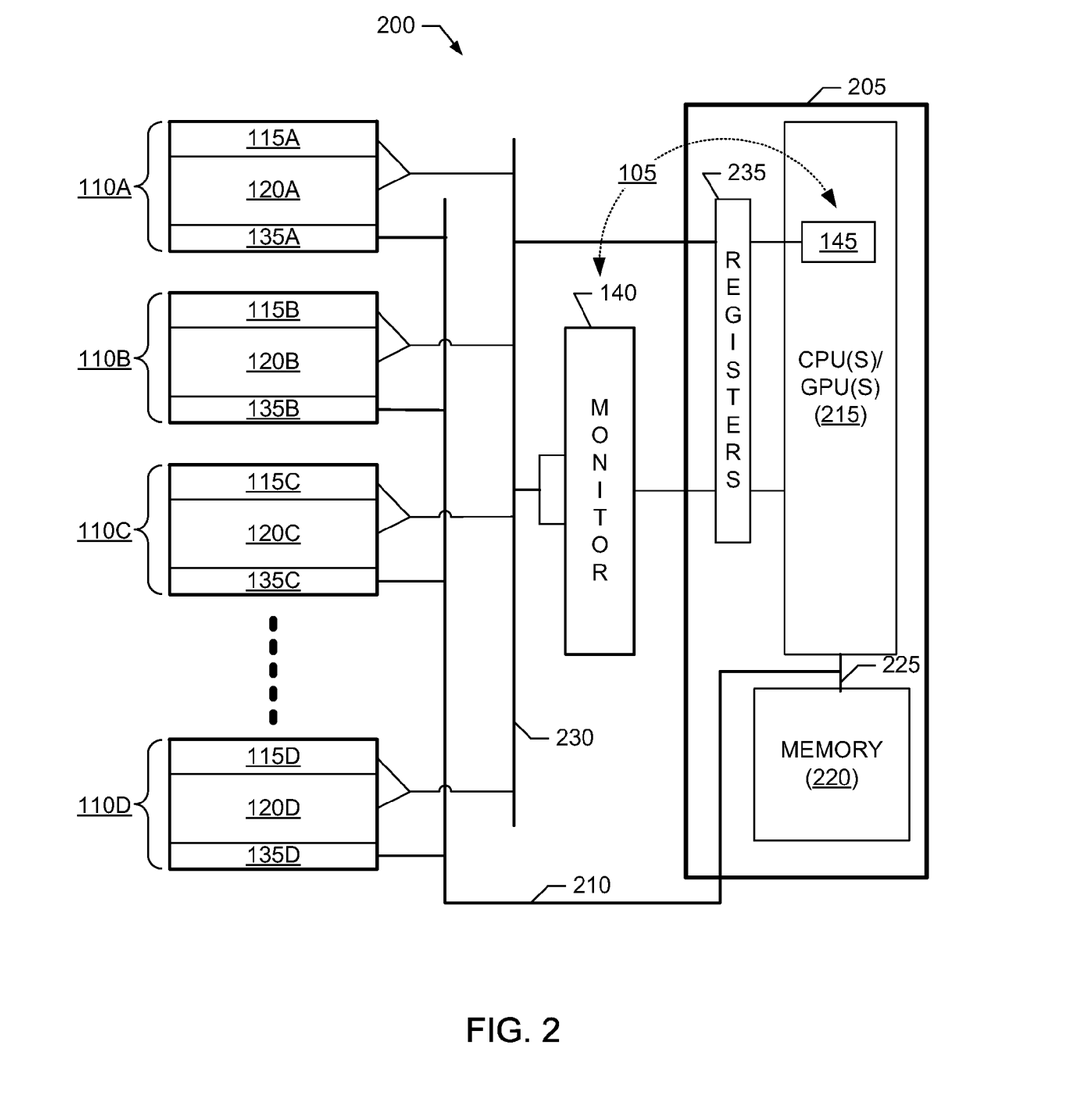
FIG. 2 is a block diagram of an example system in which multiple nanostores can be controlled based on monitored performance.

An example system 200 containing multiple example nanostores 110A-D that can be controlled based on monitored performance in accordance with the example methods, apparatus and articles of manufacture described herein is illustrated in FIG. 2. The nanostores 110A-D included in the system 200 can each be implemented by respective instances of the nanostore 110 of FIG. 1. As such, the nanostores 110A-D of the illustrated example include respective compute logic 115A-D, datastores 120A-D and network interfaces 135A-D that can each be implemented by respective instances of the compute logic 115, datastore 120 and network interface 135 of FIG. 1.

In the system 200 of the illustrated example, the nanostores 110A-D are communicatively coupled with an example processor board 205 via an example nanostore network bus 210. In some examples, the nanostores 110A-D and the nanostore network bus 210 are integrated with (e.g., included on) the processor board 205. The processor board 205 includes one or more processing units 215 that can correspond to one or more central processing units (CPUs), one or more graphics processing units (GPUs), etc., or any combination thereof. For example, one or more of the processing unit(s) 215 can be implemented by one or more of the processors 1012 included in the example processing system 1000 of FIG. 10, which is described in greater detail below. The processor board 205 also includes an example memory 220 that can correspond to one or more hierarchical levels and/or types of memory. For example, the memory can be implemented by one or more of the volatile memory 1018, the non-volatile memory 1020 and/or the mass storage devices 1030 included in the example processing system 1000 of FIG. 10, which is described in greater detail below. In the illustrated example, the processing unit(s) 215 is/(are) communicatively coupled to the memory 220 and the nanostore network bus 210 via a memory bus 225. The memory bus 225 and the nanostore network bus 210 can be implemented using any appropriate bus and/or other type of communication interface(s) and/or interconnections. Although only one processor board 205 is illustrated in FIG. 2, the system 200 can include multiple processor boards 205, one or more of which are connected to one or more of the nanostores 110A-D via one or more nanostore network busses 210.

The system 200 also includes the monitor 140 to monitor performance of the nanostores 110A-D. In the illustrated example, the monitor 140 is communicatively coupled to an example nanostore control bus 230 that, in turn, is communicatively coupled to the nanostores 110A-D. The nanostore control bus 230 can be implemented by any appropriate bus or other type of communication interface(s) and/or interconnection(s) that enable performance (such as in the form of timing variations, voltage fluctuations, memory access errors, etc.) to be monitored by the monitor 140. The monitor 140 of the illustrated example can be, for example, integrated into (e.g., included on) the processor board 205, separate from but communicatively coupled to the processor board 205, or partially integrated into and partially separate from the processor board 205.

The system 200 of FIG. 2 also includes the nanostore controller 145, which is implemented by machine readable instructions executed by one or more of the processing units 145. As such, in the illustrated example of FIG. 2, the wearout manager 105 is implemented as a combination of a hardware-based monitor 140 (e.g., integrated with the processor board 205, separate from the processor board 205, or a combination of both) and a software-based nanostore controller 145 executed by the processing unit(s) 215. In other examples, the monitor 140 and nanostore controller 145 could both be implemented as hardware, or both as software executed by the processing unit(s) 215, etc., or any combination thereof.

In the system 200, the monitor 140 interfaces with one or more example registers 235. The monitor 140 writes monitored performance data/results to the register(s) 235. The nanostore controller 145 implemented by the processing unit(s) 215 reads the performance data/results from the register(s) 235 (e.g., based on receiving an interrupt and/or reading the register(s) at a polling frequency) and then processes the monitored performance data/results to determine how to control the nanostores 110A-D, as described above. In the illustrated example, the nanostore controller 145 writes control information (e.g., to set operating frequencies, operating voltages, etc.) to one or more of the register(s) 235, which convey the control information to the nanostores 110A-D. As such, in the illustrated example of FIG. 2, the nanostore control bus 230 is implemented by any appropriate bus and/or other type of communication interface(s) and/or interconnection(s) that, in addition to enabling monitoring as described above, also enable control information (such as in the form of operating speed adjustments, operating voltage adjustments, etc.) to be provided from the register(s) 235 to the nanostores 110A-D.

Figure 3:
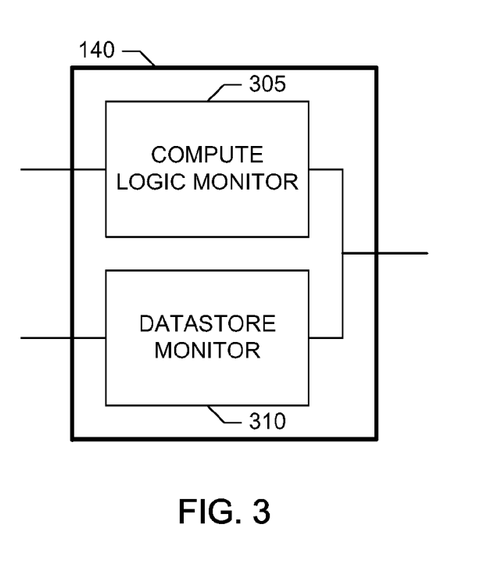
FIG. 3 is a block diagram of an example monitor that may be used to implement the wearout manager of FIG. 1.

A block diagram of an example implementation of the monitor 140 of FIGS. 1-2 is illustrated in FIG. 3. The example monitor 140 of FIG. 3 includes an example compute logic monitor 305 to monitor performance of the compute logic 115 included in the nanostore 110. For example, the compute logic monitor 305 can monitor for timing violations, timing variations, voltage fluctuations, parity/ECC errors, etc., during operation of the compute logic 115. The example monitor 140 of FIG. 3 also includes an example datastore monitor 310 to monitor performance of the datastore 120 included in the nanostore 110. For example, the datastore monitor 310 can monitor for data access errors (such as data read errors, data write errors, etc.) during operation of the datastore 120 using any appropriate monitoring technique.

Figure 4:
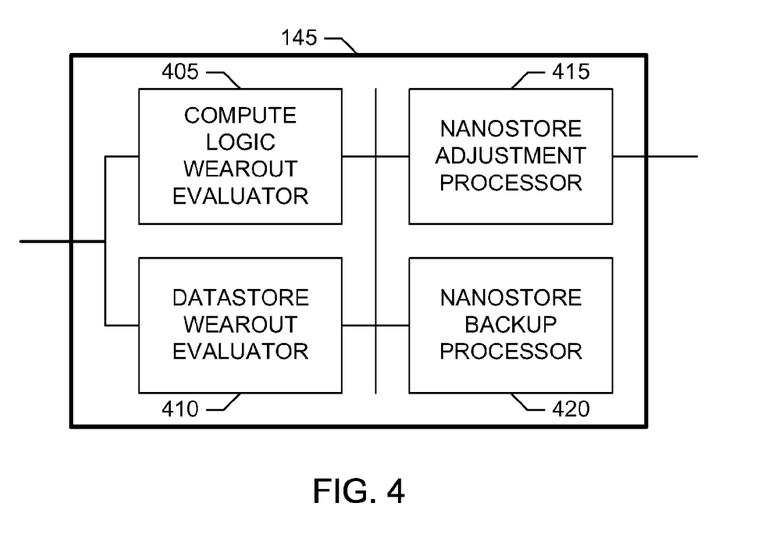
FIG. 4 is a block diagram of an example nanostore controller that may be used to implement the wearout manager of FIG. 1.

A block diagram of an example implementation of the nanostore controller 145 of FIGS. 1-2 is illustrated in FIG. 4. The example nanostore controller 145 of FIG. 4 includes an example compute logic wearout evaluator 405 to determine the wearout of the compute logic 115 of the nanostore 110 using monitored performance information obtained from the monitor 140. In some examples, the compute logic wearout evaluator 405 obtains one or more timing violation measurements, timing variation measurements, voltage fluctuation measurements, parity/ECC error measurements, etc., from the monitor 140. The compute logic wearout evaluator 405 determines (or predicts) the wearout of the compute logic 115 by evaluating one or more functions (such as one or more mathematical expressions(s), one or more databases or data tables, etc.) that transform or otherwise correlate/map the input performance data (e.g., the timing violation measurements, timing variation measurements, voltage fluctuation measurements, parity/ECC error measurements, etc.) to wearout of the compute logic 115. In some examples, the wearout of the compute logic 115 is expressed as, or represents, one or more of an expected time to failure, an expected number of operations until failure, etc., for the compute logic 115. The function(s) for transforming monitored performance measurements to wearout may be determined theoretically and/or analytically from, for example, characteristics of the semiconductor technology used to implement the nanostore 110, experimental data, etc., and/or any combination thereof.

The example nanostore controller 145 of FIG. 4 includes an example datastore wearout evaluator 410 to determine the wearout of the datastore 120 of the nanostore 110 using monitored performance information obtained from the monitor 140. In some examples, the datastore wearout evaluator 410 obtains one or more memory access error measurements from the monitor 140. The datastore wearout evaluator 410 determines (or predicts) the wearout of the datastore 120 by evaluating one or more functions (such as one or more mathematical expressions(s), one or more databases or data tables, etc.) that transform or otherwise correlate/map the input performance data (e.g., the memory access errors) to wearout of the datastore 120. In some examples, the wearout of the datastore 120 is expressed as, or represents, one or more of an expected time to failure, an expected number of operations until failure, etc., for the datastore 120. As noted above, the function(s) for transforming monitored performance measurements to wearout may be determined theoretically and/or analytically from, for example, characteristics of the semiconductor technology used to implement the nanostore 110, experimental data, etc. and/or any combination thereof.

Additionally, the nanostore controller 145 of FIG. 4 includes an example nanostore adjustment processor 415 to adjust operation of the nanostore 110 in accordance with the wearout of the compute logic 115 (e.g., as determined by the compute logic wearout evaluator 405) and/or the wearout of the datastore 120 (e.g., as determined by the datastore wearout evaluator 410). For example, the nanostore adjustment processor 415 may adjust operation of the control logic 115 to compensate for the relative difference in the wearouts of the control logic 115 and the datastore 120. Operation of the nanostore adjustment processor 415 is described in greater detail below in connection with descriptions of FIGS. 5-9.

The nanostore controller 145 of FIG. 4 further includes an example nanostore backup processor 420 to backup the data stored in nanostore 110. For example, the nanostore backup processor 420 causes the data stored in the datastore 120 of the nanostore 110 (and/or a summary of this data) to be backed-up when the compute logic wearout evaluator 405 determines that wearout of the compute logic 115 is imminent and, thus, the datastore 120 may soon become inaccessible. In such an example, the nanostore backup processor 420, in conjunction with the nanostore adjustment processor 415, can reduce the operating speed (e.g., the operating clock rate, the operating oscillator frequency, etc.) of the nanostore 110 and, in particular, the control logic 115 to enable the control logic 115 to continue to access the data in the datastore 120, thereby permitting the data to be retrieved, summarized if appropriate, and stored in backup memory. Operation of the nanostore backup processor 420 is described in greater detail below in connection with descriptions of FIGS. 5-9.

While example manners of implementing the wearout manager 105, the monitor 140 and the nanostore controller 145 have been illustrated in FIGS. 1-4, one or more of the elements, processes and/or devices illustrated in FIGS. 1-4 may be combined, divided, re-arranged, omitted, eliminated and/or implemented in any other way. Further, the example compute logic monitor 305, the example datastore monitor 310, the example compute logic wearout evaluator 405, the example datastore wearout evaluator 410, the example nanostore adjustment processor 415, the example nanostore backup processor 420 and/or, more generally, the example monitor 140, the example nanostore controller 145 and/or the example wearout manager 105 of FIGS. 1-4 may be implemented by hardware, software, firmware and/or any combination of hardware, software and/or firmware. Thus, for example, any of the example compute logic monitor 305, the example datastore monitor 310, the example compute logic wearout evaluator 405, the example datastore wearout evaluator 410, the example nanostore adjustment processor 415, the example nanostore backup processor 420 and/or, more generally, the example monitor 140, the example nanostore controller 145 and/or the example wearout manager 105 could be implemented by one or more circuit(s), programmable processor(s), semiconductor device(s), such as one or more application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example wearout manager 105, the example monitor 140, the example nanostore controller 145, the example compute logic monitor 305, the example datastore monitor 310, the example compute logic wearout evaluator 405, the example datastore wearout evaluator 410, the example nanostore adjustment processor 415 and/or the example nanostore backup processor 420 are hereby expressly defined to include a tangible computer readable medium such as a memory, digital versatile disk (DVD), compact disk (CD), etc., storing such software and/or firmware. Further still, the example wearout manager 105, the example monitor 140 and/or the example nanostore controller 145 of FIGS. 1-4 may include one or more elements, processes and/or devices in addition to, or instead of, those illustrated in FIG. 4, and/or may include more than one of any or all of the illustrated elements, processes and devices.

Flowcharts representative of example processes that may be executed to implement the example wearout manager 105, the example monitor 140, the example nanostore controller 145, the example compute logic monitor 305, the example datastore monitor 310, the example compute logic wearout evaluator 405, the example datastore wearout evaluator 410, the example nanostore adjustment processor 415 and/or the example nanostore backup processor 420 are shown in FIGS. 5-9. In these examples, the processes represented by each flowchart may comprise one or more programs comprising machine executable instructions for execution by a processor, such as the processor 1012 shown in the example processing system 1000 discussed below in connection with FIG. 10. Alternatively, the entire program or programs and/or portions thereof implementing one or more of the processes represented by the flowcharts of FIGS. 5-9 could be executed by a device other than the processor 1012 (e.g., such as a controller and/or any other suitable device) and/or embodied in firmware or dedicated hardware (e.g., implemented by one or more semiconductors, such as one or more of an ASIC, a PLD, an FPLD, discrete logic, etc., or any combination thereof). Also, one or more of the processes represented by the flowcharts of FIGS. 5-9 may be implemented manually. Further, although the example processes are described with reference to the flowcharts illustrated in FIGS. 5-9, many other techniques for implementing the example methods and apparatus described herein may alternatively be used. For example, with reference to the flowcharts illustrated in FIGS. 5-9, the order of execution of the blocks may be changed, and/or some of the blocks described may be changed, eliminated, combined and/or subdivided into multiple blocks.

As mentioned above, the example processes of FIGS. 5-9 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 5-9 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise.

Figure 5:
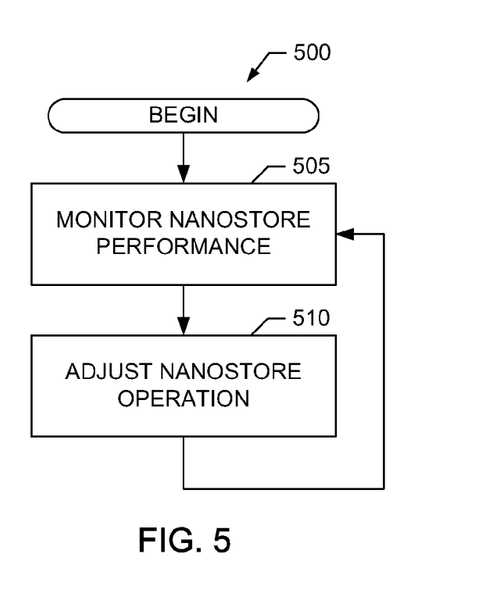
FIG. 5 is a flowchart representative of an example process to implement the wearout manager of FIGS. 1-2, the monitor of FIG. 3 and/or the nanostore controller of FIG. 4.

An example process 500 that may be executed to implement the example wearout manager 105 of FIGS. 1-2 is represented by the flowchart shown in FIG. 5. With reference to the preceding figures, the process 500 begins execution at block 505 of FIG. 5 at which the monitor 140 of the wearout manager 105 monitors performance of the compute logic 115 included in the nanostore 110. As noted above, the nanostore 110 includes the compute logic 115 and the datastore 120, which is accessible via the compute logic 115. At block 510, the nanostore controller 145 of the wearout manager 105 adjusts operation of the compute logic 115 in response to detecting a performance indicator associated with wearout of the compute logic 115 to permit the compute logic 115 to continue to access the datastore 120. Processing then repeats to enable performance of the compute logic 115 to be monitored repeatedly over time, and adjustment of the operation of the compute logic 115 to be performed accordingly.

Figure 6:
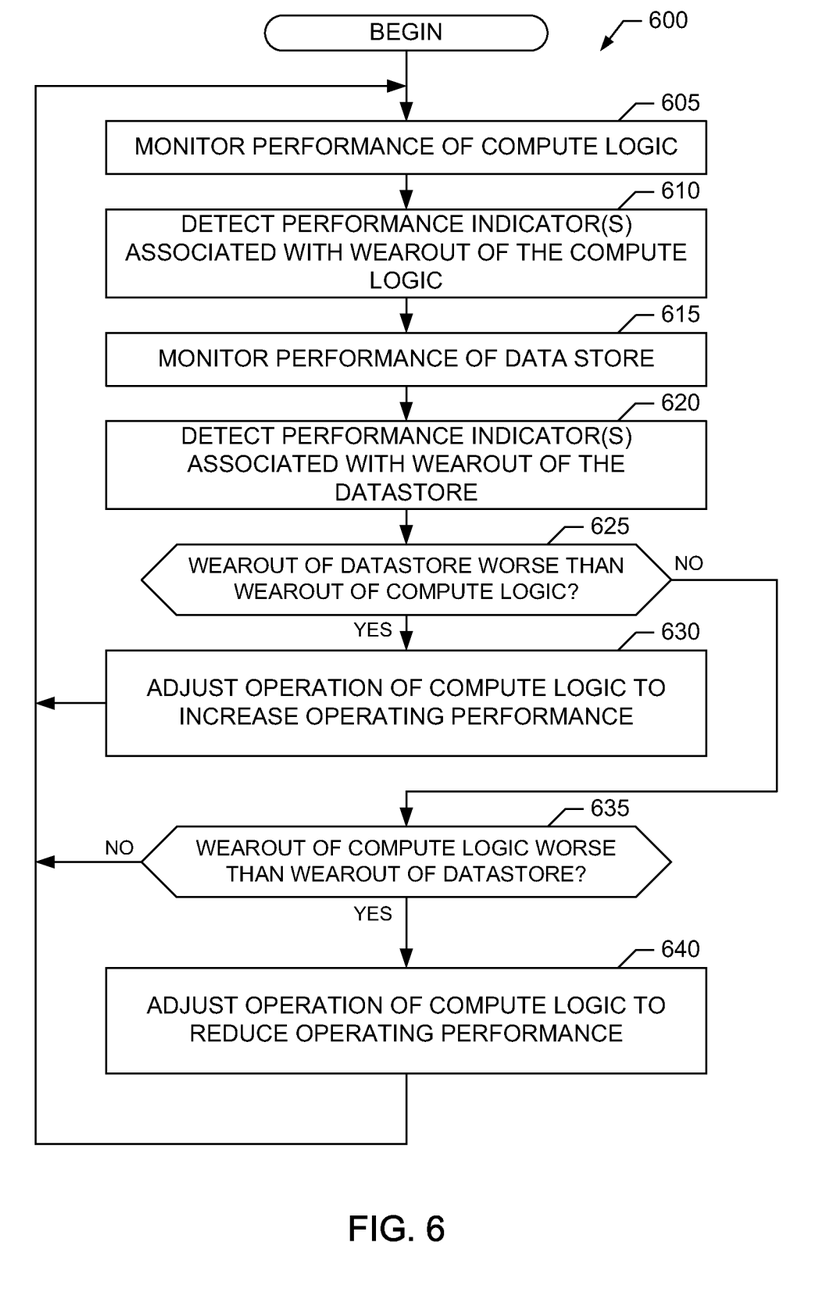
FIG. 6 is a flowchart representative of a second example process to implement the wearout manager of FIGS. 1-2, the monitor of FIG. 3 and/or the nanostore controller of FIG. 4.

A second example process 600 that may be executed to implement the example wearout manager 105 of FIGS. 1-2 is represented by the flowchart shown in FIG. 6. With reference to the preceding figures, the process 600 begins execution at block 605 of FIG. 6 at which the monitor 140 of the wearout manager 105 monitors performance of the compute logic 115 included in the nanostore 110. For example, at block 605 the compute logic monitor 305 of the monitor 140 can monitor the performance of the compute logic 115 by monitoring for one or more of timing violation(s), timing variation(s), voltage fluctuation(s), parity/ECC error measurements, etc., associated with operation of the compute logic 115. At block 610, the nanostore controller 145 of the wearout manager 105 detects one or more performance indicator(s) indicative of wearout of the compute logic 115. For example, and as described above, the compute logic wearout evaluator 405 of the nanostore controller 145 can evaluate the wearout of the compute logic 115 by evaluating one or more functions that characterize wearout in terms of the monitored performance information provided at block 605 (e.g., such as the monitored timing violation(s), timing variation(s), voltage fluctuation(s), parity/ECC error measurements, etc). The compute logic wearout evaluator 405 can then, for example, use the results of the wearout evaluation to detect one or more performance indicators that indicate whether the compute logic 115 has reached a particular amount of wearout. Examples of such performance indicators include, but are not limited to, detecting that a timing violation has occurred, detecting that a monitored timing variation has exceeded a timing guard band associated with a particular amount of wearout (e.g., as specified by the function(s) characterizing wearout of the compute logic 115), detecting that a monitored voltage fluctuation has exceeded a voltage guard band associated with a particular amount of wearout (e.g., as specified by the function(s) characterizing wearout of the compute logic 115), detecting that a number of monitored parity/ECC errors has exceeded a threshold, etc., or any combination thereof.

At block 615, the monitor 140 of the wearout manager 105 monitors performance of the datastore 120 included in the nanostore 110. For example, at block 615 the datastore monitor 310 of the monitor 140 can monitor the performance of the datastore 120 by monitoring for one or more memory access errors (such as data read error(s), data write error(s), etc.) during operation of the datastore 120. At block 620, the nanostore controller 145 of the wearout manager 105 detects one or more performance indicator(s) indicative of wearout of the datastore 120. For example, and as described above, the datastore wearout evaluator 410 of the nanostore controller 145 can evaluate the wearout of the datastore 120 by evaluating one or more functions that characterize wearout in terms of the monitored performance information provide at block 615 (e.g., such as the monitored memory access errors). The datastore wearout evaluator 410 can then, for example, use the results of the wearout evaluation to detect one or more performance indicators that indicate whether the datastore 120 has reached a particular amount of wearout. Examples of such performance indicators include, but are not limited to, detecting that a particular number of memory access errors and/or a particular type of memory access error have occurred within a particular monitoring interval (e.g., as specified by the function(s) characterizing wearout of the datastore 120).

Next, the nanostore controller 145 compares the wearout of the datastore 120 (e.g., as indicated by the performance indicator(s) determined at block 620) and the wearout of the compute logic 115 (e.g., as indicated by the performance indicator(s) determined at block 610). If the wearout of the datastore 120 is worse (e.g., closer to expected failure) than the wearout of the compute logic 115 (block 625), at block 630 the nanostore controller 145 adjusts operation of the compute logic 115 to increase the operating performance of the compute logic 115. For example, the nanostore adjustment processor 415 of the nanostore controller 145 can increase the operating speed and/or the operating voltage of the compute logic 115 and/or, more generally, the nanostore 110 to enable the nanostore 110 to run more computationally intensive workloads. As such, although such adjustment may cause the rate of wearout of compute logic 115 to be increased to correspond to the wearout of the datastore 120, the nanostore 110 can be used to run more computationally intensive workloads during its useful lifespan.

However, if the wearout of the compute logic 115 is worse (e.g., closer to expected failure) than the wearout of the datastore 120 (block 635), at block 640 the nanostore controller 145 adjusts operation of the compute logic 115 to decrease the operating performance of the compute logic 115. For example, the nanostore adjustment processor 415 of the nanostore controller 145 can decrease the operating speed and/or the operating voltage of the compute logic 115 and/or, more generally, the nanostore 110. As such, the useful lifespan of the nanostore 110 may be increased, although the reduced performance may limit the nanostore 110 to being used as a storage node and/or to run I/O focused workloads. Processing then repeats to enable performance of the nanostore 110 to be monitored repeatedly over time, and adjustment of the operation of the nanostore 110 to be performed accordingly.

Figure 7:
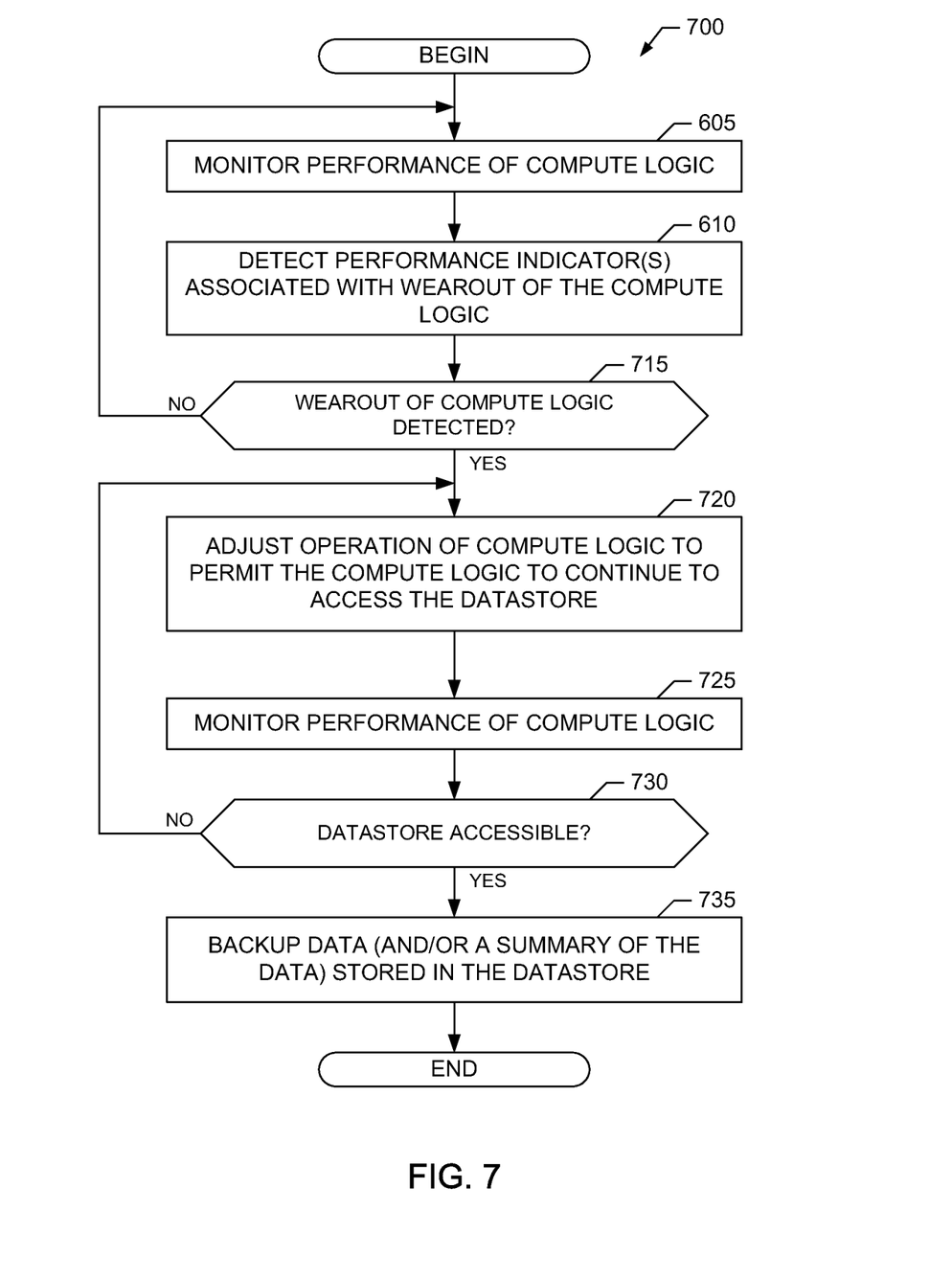
FIG. 7 is a flowchart representative of a third example process to implement the wearout manager of FIGS. 1-2, the monitor of FIG. 3 and/or the nanostore controller of FIG. 4.

A third example process 700 that may be executed to implement the example wearout manager 105 of FIGS. 1-2 is represented by the flowchart shown in FIG. 7. With reference to the preceding figures, the process 700 begins execution at block 605 of FIG. 7 at which the monitor 140 of the wearout manager 105 monitors performance of the compute logic 115 included in the nanostore 110. At block 610, the nanostore controller 145 of the wearout manager 105 detects one or more performance indicator(s) indicative of wearout of the compute logic 115. Blocks 605 and 610 are described in greater detail above in connection with the description of FIG. 6.

Next, at block 715 the nanostore controller 145 determines whether wearout of the compute logic 115 has been detected (as indicated by the performance indicator(s) of block 610). If wearout of the compute logic 115 is not detected, processing returns to block 605 and 610 to allow the performance of the compute logic 115 to be repeatedly monitored. However, if wearout of the compute logic 115 is detected, at block 720 the nanostore controller 145 adjusts operation of the compute logic 115 to permit the compute logic 115 to continue to access the datastore 120 of the nanostore 110. For example, at block 720 the nanostore adjustment processor 415 can decrement or otherwise reduce the operating speed of the compute logic 115.

At block 725, the monitor 140 again monitors the performance of the compute logic 115 (e.g., using processing such as that performed at block 605). At block 730, the nanostore controller 145 uses the monitored performance information obtained at block 725 to determine whether the adjustment(s) made at block 720 allow the compute logic 115 to access the datastore 120. For example, the monitor 140 can determine that the datastore 120 is accessible if a previously monitored timing violation has been eliminated, if monitored timing variation(s) are within a guard band, if memory access errors are no longer present, etc. If the datastore 120 is determined to not be accessible (block 730), processing returns to block 720 at which, for example, the nanostore adjustment processor 415 further decrements or otherwise reduces the operating speed of the compute logic 115. However, if the datastore 120 is determined to be accessible (block 730), then at block 735 the nanostore backup processor 420 of the nanostore controller 145 causes the data stored in the datastore 120 to be backed up in any appropriate backup memory (e.g., such as one or more other nanostores and/or other archive storage). Additionally or alternatively, at block 735 the nanostore backup processor 420 can determine a summary of the data stored in the datastore 120 (e.g., using any appropriate data summarization technique) and then cause this data summary to be stored in the backup memory.

Figure 8:
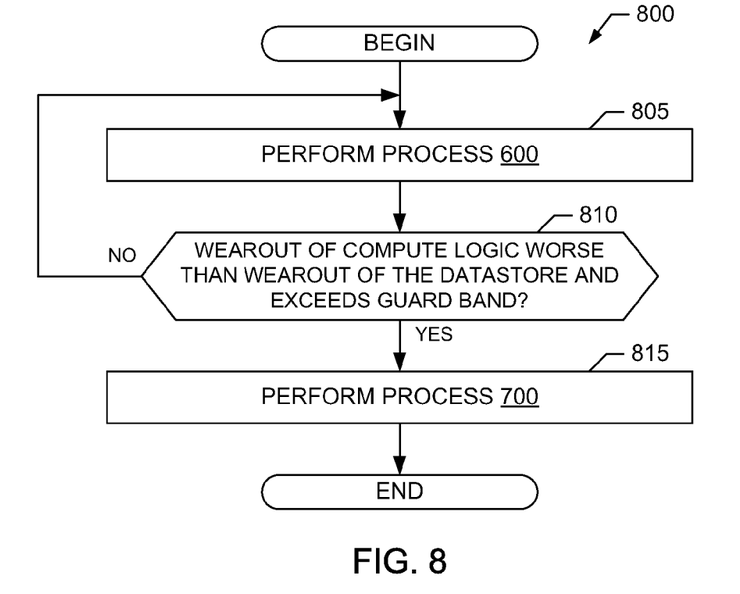
FIG. 8 is a flowchart representative of a fourth process to implement the wearout manager of FIGS. 1-2, the monitor of FIG. 3 and/or the nanostore controller of FIG. 4.

A fourth example process 800 that may be executed to implement the example wearout manager 105 of FIGS. 1-2 is represented by the flowchart shown in FIG. 8. With reference to the preceding figures, the process 800 begins execution at block 805 of FIG. 8 at which the wearout manager 105 executes the example process 600 illustrated in FIG. 6 to adjust operation of the nanostore 110 based on comparing the wearout of the nanostore compute logic 115 and the wearout of the nanostore datastore 120. At block 810, the nanostore controller 145 of the wearout manager 105 determines whether wearout of the compute logic 115 is worse than the wearout of the datastore 120 and whether the wearout of the compute logic 115 exceeds a guard band. Processing at block 805 is repeated until the condition at block 810 occurs. When the condition at block 810 occurs (e.g., which indicates that the compute logic 115 has experienced wearout indicative of imminent failure), processing proceeds to block 815. At block 815, the wearout manager 105 executes the example process 700 illustrated in FIG. 7 to adjust operation of the compute logic 115 to permit continued access to the datastore 120 and allow the data stored in the datastore 120 to be backed up in an appropriate backup memory.

Figure 9:
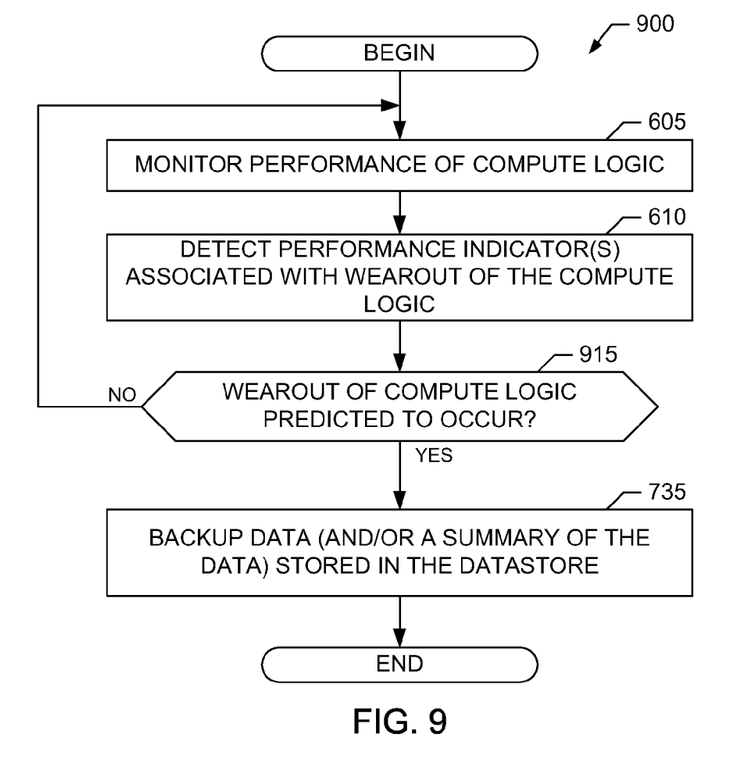
FIG. 9 is a flowchart representative of a fifth example process to implement the wearout manager of FIGS. 1-2, the monitor of FIG. 3 and/or the nanostore controller of FIG. 4.

A fifth example process 900 that may be executed to implement the example wearout manager 105 of FIGS. 1-2 is represented by the flowchart shown in FIG. 9. With reference to the preceding figures, the process 900 begins execution at block 605 of FIG. 9 at which the monitor 140 of the wearout manager 105 monitors performance of the compute logic 115 included in the nanostore 110. At block 610, the nanostore controller 145 of the wearout manager 105 detects one or more performance indicator(s) indicative of wearout of the compute logic 115. Blocks 605 and 610 are described in greater detail above in connection with the description of FIG. 6.

Next, at block 915 the nanostore controller 145 determines whether wearout of the compute logic 115 is predicted to occur. For example, at block 915 the compute logic wearout evaluator 405 can determine whether the performance indicator(s) obtained at block 610 indicate that, according to the function(s) characterizing wearout of compute logic 115, wearout to a degree that may prevent access to the datastore 120 is predicted to occur. If such wearout is predicted to occur, at block 735 the nanostore backup processor 420 of the nanostore controller 145 causes the data stored in the datastore 120 (and/or a summary of this data) to be backed up in an appropriate backup memory (e.g., as described above in connection with FIG. 7). In this way, the wearout manager 105 can proactively backup the data stored in the datastore 120 before wearout of the compute logic 115 impacts access to the datastore 120.

Figure 10:
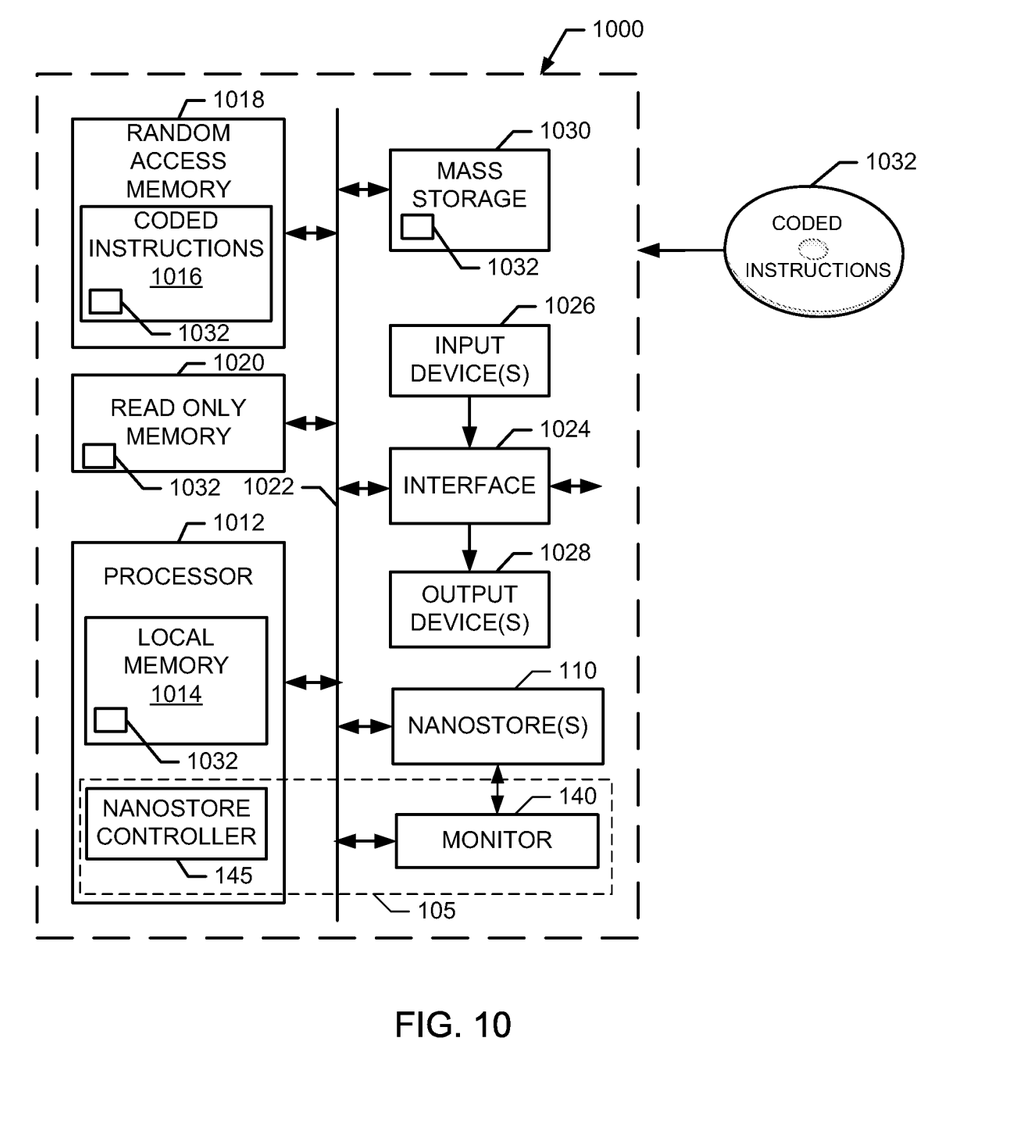
FIG. 10 is a block diagram of an example processing system that may execute example machine readable instructions to implement one or more of the processes of FIGS. 5-8 and/or 9 to implement the wearout manager of FIGS. 1-2, the monitor of FIG. 3 and/or the nanostore controller of FIG. 4.

FIG. 10 is a block diagram of an example processing system 1000 capable of implementing the apparatus and methods disclosed herein. The processing system 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012 such as a general purpose programmable processor. The processor 1012 includes a local memory 1014, and executes coded instructions 1016 present in the local memory 1014 and/or in another memory device. The processor 1012 may execute, among other things, machine readable instructions to implement one or more of the example processes represented in FIGS. 5-9. The processor 1012 may be any type of processing unit, such as one or more microprocessors, one or more microcontrollers, etc.

The processor 1012 is in communication with a main memory including a volatile memory 1018 and a non-volatile memory 1020 via a bus 1022. The volatile memory 1018 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1020 may be implemented by flash memory and/or any other desired type of memory device. Access to the main memory 1018, 1020 is typically controlled by a memory controller (not shown).

The processing system 1000 also includes an interface circuit 1024. The interface circuit 1024 may be implemented by any type of interface standard, such as an Ethernet interface, a universal serial bus (USB), and/or a third generation input/output (3GIO) interface.

One or more input devices 1026 are connected to the interface circuit 1024. The input device(s) 1026 permit a user to enter data and commands into the processor 1012. The input device(s) can be implemented by, for example, a keyboard, a mouse, a touchscreen, a track-pad, a trackball, a pointer and/or a voice recognition system.

One or more output devices 1028 are also connected to the interface circuit 1024. The output devices 1028 can be implemented, for example, by display devices (e.g., a liquid crystal display, a cathode ray tube display (CRT)), by a printer and/or by speakers. The interface circuit 1024, thus, typically includes a graphics driver card.

The interface circuit 1024 also includes a communication device such as a modem or network interface card to facilitate exchange of data with external computers via a network (e.g., an Ethernet connection, a digital subscriber line (DSL), a telephone line, coaxial cable, a cellular telephone system, etc.).

The processing system 1000 also includes one or more mass storage devices 1030 for storing machine readable instructions and data. Examples of such mass storage devices 1030 include floppy disk drives, hard drive disks, compact disk drives and digital versatile disk (DVD) drives.

Coded instructions 1032 for implementing one or more of the example processes of FIGS. 5-9 may be stored in the mass storage device 1030, in the volatile memory 1018, in the non-volatile memory 1020, in the local memory 1014 and/or on a removable storage medium, such as a CD or DVD 1032.

Additionally, the processing system 1000 of FIG. 10 includes one or more nanostores 110. To control the nanostore(s) 110 based on monitored performance, the processing system 1000 further includes the wearout manager 105, which includes the monitor 140 and the nanostore controller 145 implemented in a manner similar to the example illustrated in FIG. 2.

As an alternative to implementing the methods and/or apparatus described herein in a system such as the processing system of FIG. 10, the methods and or apparatus described herein may be embedded in a structure such as a processor and/or an ASIC (application specific integrated circuit).

Finally, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
monitoring performance of a nanostore, the nanostore including compute logic and a datastore accessible via the compute logic;
controlling operation of the nanostore to permit the compute logic to continue to access the datastore in response to detecting a first performance indicator associated with wearout of the compute logic;
monitoring performance of the nanostore to detect a second performance indicator associated with wearout of the datastore; and
controlling the operation of the compute logic to increase operating performance of the nanostore in response to determining that the wearout of the datastore is worse than the wearout of the compute logic.

2. A method as defined in claim 1 wherein monitoring performance of the nanostore comprises monitoring for at least one of a timing violation, a timing variation, a voltage fluctuation, a parity error or an error correcting code error associated with the compute logic.

3. A method as defined in claim 1 wherein detecting the first performance indicator associated with wearout of the compute logic comprises detecting that at least one of a monitored timing variation or a monitored voltage fluctuation exceeds a guard band.

4. A method as defined in claim 1 wherein controlling operation of the nanostore to permit the compute logic to continue to access the datastore comprises reducing an operating speed of the compute logic until at least one of a monitored timing violation associated with the compute logic is reduced or a monitored timing variation associated with the compute logic is within a guard band.

5. A method as defined in claim 1 further comprising backing up at least one of data stored in the datastore or a summary of the data stored in the datastore after controlling the operation of the nanostore to permit the compute logic to continue to access the datastore.

6. A method as defined in claim 1 wherein monitoring performance of the nanostore to detect the second performance indicator comprises detecting an error associated with accessing the datastore.

7. A method as defined in claim 1 wherein controlling the operation of the nanostore to permit the compute logic to continue to access the datastore is in response to both detecting the first performance indicator associated with the wearout of the compute logic and determining that the wearout of the compute logic is worse than the wearout of the datastore.

8. An apparatus comprising:
a monitor to monitor performance of compute logic and a datastore implementing a nanostore; and
a controller to:
determine wearout of the compute logic based on monitoring the performance of the compute logic;
determine wearout of the datastore based on monitoring the performance of the datastore; and
adjust operation of the compute logic based on a comparison of the wearout of the compute logic and the wearout of the datastore.

9. An apparatus as defined in claim 8 wherein the monitor is to:
monitor for at least one of a timing violation, a timing variation, a voltage fluctuation, a parity error or an error correcting code error associated with the compute logic to monitor the performance of the compute logic; and
monitor for an error associated with accessing the datastore to monitor the performance of the datastore.

10. An apparatus as defined in claim 8 wherein adjusting the operation of the compute logic comprises:
adjusting the operation of the compute logic to increase an operating speed of the nanostore in response to determining that the wearout of the datastore is worse than the wearout of the compute logic; and
adjusting the operation of the compute logic to reduce the operating speed of the nanostore in response to determining that the wearout of the datastore is worse than the wearout of the compute logic.

11. An apparatus as defined in claim 10 wherein adjusting the operation of the compute logic further comprises backing up at least one of data stored in the datastore or a summary of the data stored in the data store in response to determining that the wearout of the datastore is worse than the wearout of the compute logic and that the wearout of the compute logic exceeds a guard band.

12. A tangible machine readable medium comprising machine readable instructions which, when executed, cause a machine to at least:
monitor performance of compute logic and a datastore included in a nanostore, the datastore being accessible via the compute logic;
determine a first performance indicator associated with wearout of the compute logic based on monitoring the performance of the compute logic;
determine a second performance indicator associated with wearout of the datastore based on monitoring the performance of the datastore; and
adjust operation of the compute logic based on a comparison of the wearout of the compute logic and the wearout of the datastore.

13. A tangible machine readable medium as defined in claim 12 wherein the machine readable instructions, when executed, cause the machine to monitor for at least one of a timing violation, a timing variation, a voltage fluctuation, a parity error or an error correcting code error associated with the compute logic to monitor the performance of the compute logic.

14. A tangible machine readable medium as defined in claim 12 wherein the wearout of the compute logic is predicted by the first performance indicator when the first performance indicator indicates that a timing variation associated with the compute logic has been monitored, but the timing variation does not exceed a guard band.

15. A tangible machine readable medium as defined in claim 12 wherein the instructions, when executed, further cause the machine to back up at least one of data stored in the datastore or a summary of the data stored in the data store when wearout of the compute logic is predicted by the first performance indicator.

16. A method comprising:
monitoring performance of compute logic and a datastore implementing a nanostore;
determining wearout of the compute logic based on monitoring the performance of the compute logic;
determining wearout of the datastore based on monitoring the performance of the datastore; and
adjusting operation of the compute logic based on a comparison of the wearout of the compute logic and the wearout of the datastore.

17. A method as defined in claim 16 wherein monitoring the performance of the compute logic comprises monitoring for at least one of a timing violation, a timing variation, a voltage fluctuation, a parity error or an error correcting code error associated with the compute logic, and monitoring the performance of the datastore comprises monitoring for an error associated with accessing the datastore.

18. A method as defined in claim 16 wherein adjusting the operation of the compute logic comprises:
adjusting the operation of the compute logic to increase an operating speed of the nanostore in response to determining that the wearout of the datastore is worse than the wearout of the compute logic; and
adjusting the operation of the compute logic to reduce the operating speed of the nanostore in response to determining that the wearout of the datastore is worse than the wearout of the compute logic.

19. A method as defined in claim 16 wherein adjusting the operation of the compute logic further comprises backing up at least one of data stored in the datastore or a summary of the data stored in the data store in response to determining that the wearout of the datastore is worse than the wearout of the compute logic and that the wearout of the compute logic exceeds a guard band.

* * * * *